ns Patent [19]

Plueddemann

[11] 3,862,079
[45] Jan. 21, 1975

[54] MODIFIED ZWITTERION RESINS
[75] Inventor: Edwin P. Plueddemann, Midland, Mich.
[73] Assignee: Dow Corning Corporation, Midland, Mich.
[22] Filed: May 21, 1973
[21] Appl. No.: 361,903

[52] U.S. Cl.................260/29.7 SQ, 260/29.6 E, 260/29.6 MQ, 260/29.7 E, 260/47, 260/79, 260/79.7, 260/332.3 R
[51] Int. Cl... C08d 7/02, C07d 63/00, C07d 63/04, C07d 65/04
[58] Field of Search ... 260/29.7 E, 29.7 SQ, 29.6 E, 260/29.6 MQ, 47, 79, 79.7, 332.3 R

[56] References Cited
UNITED STATES PATENTS
3,636,052  1/1972  Hatch et al. ................ 260/332.3 R
3,660,431  5/1972  Hatch et al. ................ 260/332.3 R

*Primary Examiner*—Melvin Goldstein
*Assistant Examiner*—T. De Benedictis, Sr.
*Attorney, Agent, or Firm*—Norman E. Lewis

[57] ABSTRACT

Small amounts of organosilanes having epoxy, amine, imino, carboxyl, or mercapto functionality are added to soluble poly(hydroxyarylpolymethylenesulfonium) zwitterionic monomer to give a material which can be added to flexible polymer latexes to increase adhesion of films deposited from such latexes.

17 Claims, No Drawings

MODIFIED ZWITTERION RESINS

BACKGROUND

The present invention relates to silane-modified zwitterionic monomers which are added to dispersions of vinyl polymers to provide increased adhesion. In one aspect, the invention relates to polymeric coatings which have good adhesion to substrates under wet conditions.

Dispersions or latexes of synthetic polymers have a variety of uses, for example as coatings, paint vehicles, glass fiber sizing agents and pigment binders, caulks and sealants. It is often difficult to obtain good adhesion of a latex film to a substrate. Coupling agents, such as organosilanes and primers can be used to increase latex polymer adhesion but are generally applied to the substrate prior to coating with the latex. The priming step adds greatly to the cost of a adherent latex coating. Silane coupling agents have been added to polymeric latexes and are effective to a limited extent as "insitu" primers.

The present invention provides a silane-modified zwitterion composition which can be added to polymeric latexes to obtain good film adhesion to a variety of substrates. The silane-modified zwitterion composition provides better adhesion than either the silane or the zwitterion monomers when used separately as additives to flexible vinylic latexes.

Thus, it is an object of the present invention to provide an improved synthetic latex coating material. Another object of the invention is to provide a cured polymeric latex film which exhibits good adhesion to unprimed substrates. These and other objects of the invention will be apparent to one skilled in the art upon reading the following specification and claims.

STATEMENT OF THE INVENTION

In accordance with the present invention, there is provided a polymeric latex comprising (A) a flexible vinylic polymer dispersed in an aqueous media; and (B) 0.5 to 10 weight percent, based on the weight of vinylic polymer, of a silane modified zwitterionic composition, the composition consisting essentially of (a) about 90 to 99.5 weight percent of soluble zwitterionic monomer, at least about 10 weight percent of said monomer being of the formula

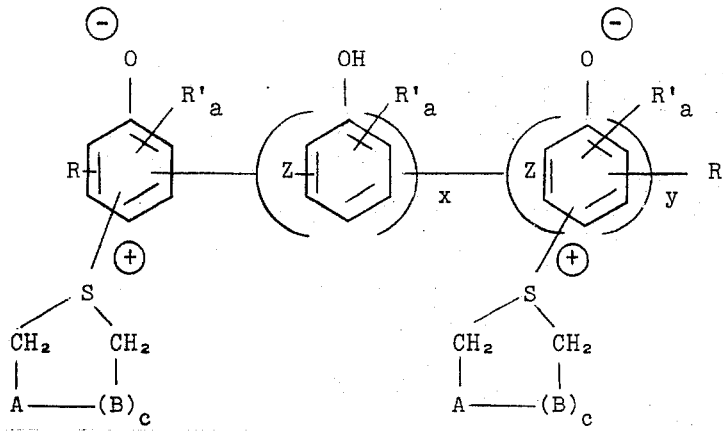

in which each R is independantly selected from the group consisting of hydrogen, chlorine and bromine atoms, the hydroxyl group and alkoxy radicals containing from one to four inclusive carbon atoms; each R' is independantly selected from the group consisting of hydrogen, chlorine and bromine atoms and alkyl radicals containing one to four inclusive carbon atoms; at least one R' being a hydrogen atom and $a$ having a value of 2 or 3; each sulfur is ortho or para to the phenolic oxygen; each A and B are independantly selected from the group consisting of —$CH_2$—, —$CHR'$—, and $c$ has a value of 1 or 2; Z is a bridging radical selected from the group consisting of —$CR''_2$—, —O—, —S—, —$O(C_mH_{2m})O$—, or

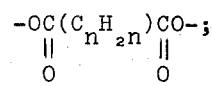

in which R'' is a hydrogen atom or an alkyl radical containing from one to four inclusive carbon atoms; $m$ has a value of from 1 to 6 inclusive and $n$ has a value of from 2 to 6 inclusive; and $x$ and $y$ are numbers with a sum of from 1 to 20; any remaining monomers being of the formula

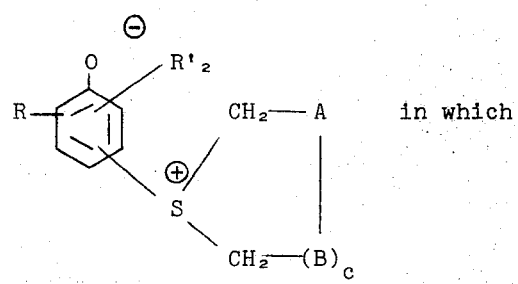

R, and R', B and $c$ are as defined and (b) about 0.5 to 10 weight percent of an organosilane coupling agent or water soluble partial condensate thereof, said silane having an organofunctional substituent attached to the silicon atom through a silicon-carbon bond, said substituent being selected from the group consisting of epoxy, amino, imino, carboxy and mercapto radicals; the remaining substituents being hydroxyl groups or non-acidic hydrolyzable radicals.

GENERAL DESCRIPTION

The soluble zwitterionic monomers specified above are classed as mono and poly(hydroxyarylpolymethylenesulfonium) hydroxide inner salts. The monofunctional zwitterionic monomers are derived from hydroxyarylpolymethylenesulfonium salts which are prepared from phenol or phenol derivatives by the processes described in U.S. Pat. No. 3,636,052. The poly(hydroxyarylmethylenesolfonium) zwitterionic monomers are derived from the corresponding salts which are prepared by condensation of a polyphenolic resin with a cyclic sulfide. Examples of suitable reactants and the methods of preparation of the poly-functional monomers are disclosed in U.S. Pat. No. 3,660,431. The disclosures of both U.S. Pat. Nos. 3,636,052 and 3,660,431 are incorporated by reference herein.

As described above and in the referenced patents, the R radicals can be hydrogen, chlorine and bromine atoms, hydroxyl radicals (—OH) or alkoxy radicals, such as methoxy, ethoxy or butoxy groups. The R' and R'' radicals can be hydrogen, chlorine or bromine atoms or alkyl radicals, such as methyl, ethyl, isopropyl and butyl groups. In the polyfunctional monomer, the divalent Z group can be —CR''$_2$—, —O—, —S—, —O(C$_m$H$_m$)O—, or

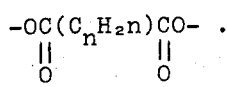

The Z radicals are derived from precursors such as bisphenol, de(hydroxy-phenyl)ether, di(hydroxy-phenyl)sulfide, bis-(o-hydroxy-phenyl)propylene glycol ether and phenolformaldehyde resins.

It has been found that about at least 10 weight % of the polyfunctional monomer must be present in any mixture of monomers utilized in the practice of the invention. The polyfunctional monomer provides crosslinking sites in the copolymers resulting from polymerization of monomer mixtures. This minimum amount of crosslinking provides physical characteristics allowing interaction of the silanes with substrates with resultant improved adhesion. Of course, the maximum crosslinking is obtained when one utilizes only polyfunctional zwitterionic monomers which polymerizes to a thermoset resin. The polyfunctional monomers in which $x$ equals zero and $y$ equals 1 are most easily synthesized and are preferred for use in the present invention.

Exemplary monomers include

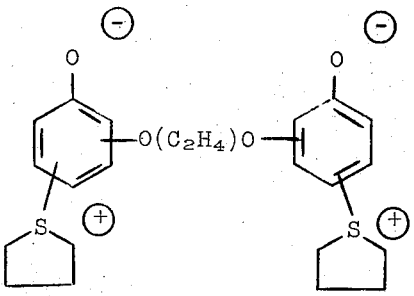

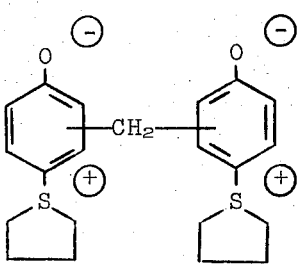

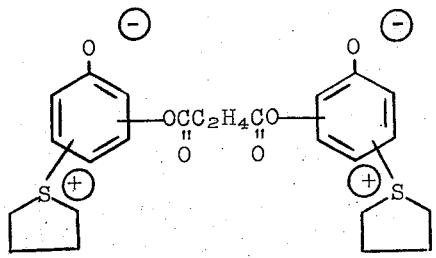

,

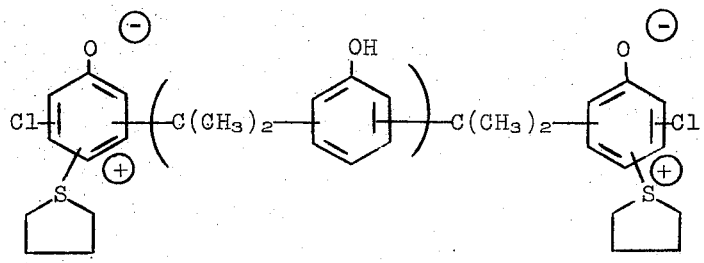

,

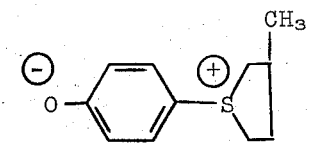

,

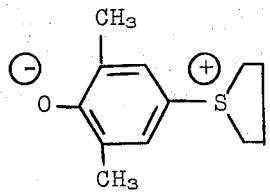

,

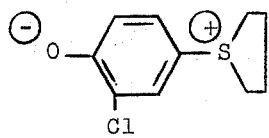

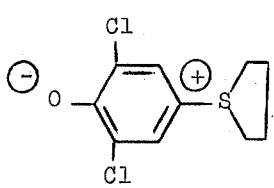

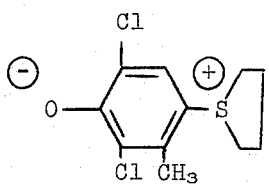

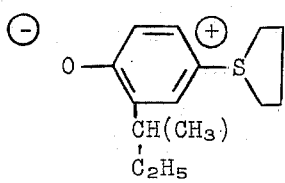

As described above, the organosilane component utilized in the practice of the invention contains an organofunctional substituent selected from the group consisting of epoxy, amine, imino, carboxy and mercapto radicals; the remaining substituents being hydroxyl groups or hydrolyzable radicals. The silanes are well-known in the art and can be represented as having the general formula:

R'''SiX$_3$, in which R''' is the organofunctional substituent attached to the silicon atom through a silicon-carbon bond and X is a hydroxyl or hydrolyzable radical.

Representative of suitable epoxy functionality are substituents such as

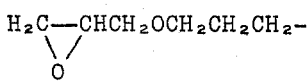

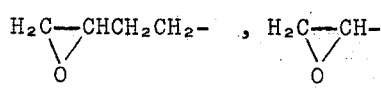

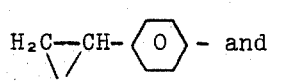 and 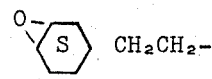

Suitable amino substituents include primary, secondary, tertiary amine and diamine radicals such as N-beta(aminoethyl)gamma-aminopropyl, gamma-aminopropyl, methylaminopropyl and dimethylamino-propyl. The aminoalkyl and N(aminoalkyl)aminoalkyl silanes are commercially available. The imino substituents include radicals of the formula

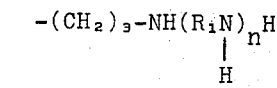

in which R$_1$ is an alkylene radical of from two to four carbon atoms and n has a value of from 3 to over 2,000, such as

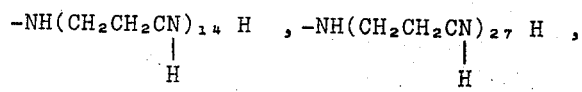

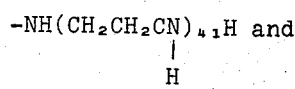

and

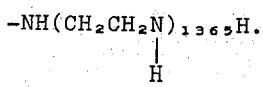

Other suitable imino substituents are described in U.S. Pat. No. 3,560,543. Examples of suitable carboxy-functional radicals include

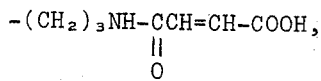

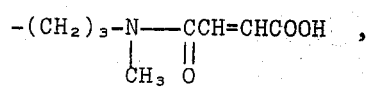

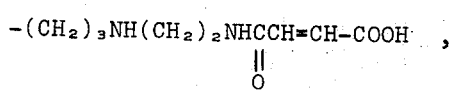

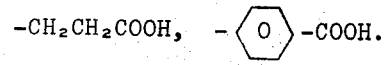

The ammonium salts of such carboxysilanes can also be utilized. Mercapto silanes containing —(CH$_2$)$_3$SH, —CH$_2$CH$_2$SCH$_2$CH$_2$C(CH$_2$SH)$_2$C$_2$H$_5$ and other mercaptoalkyl radicals as exemplified in U.S. Pat. No. 3,388,144 can also be utilized in the practice of the invention.

The remaining substituents on the silicon atom of the organosilane are hydroxyl groups or non-acidic hydrolyzable radicals. Hydrolyzable groups include groups of the formula —OZ when Z is any hydrocarbon or halogenated hydrocarbon group such as methyl, ethyl, isopropyl, octadecyl, allyl, hexenyl, cyclohexyl, phenyl, benzyl, beta-phenylethyl, 2-chloroethyl, chlorophenyl, 3,3,3-trifluoropropyl or bromocyclohexyl; any hydrocarbon ether radical such as 2,methoxyethyl, 2-ethoxyisopropyl, 2-butoxyisobutyl, p-methoxyphenyl or —(CH$_2$CH$_2$O)$_2$CH$_3$; any N,N-amino radical such as dimethylamino, diethylamino, ethylmethylamino, diphenylamino, or dicyclohexylamino. X can also be any amino radical such as NH₂, dimethylamino, diethylamino, methylphenylamino or dicyclohexylamino; any ketoxime radical of the formula —ON=CM₂ or —ON=CM' in which M is any monovalent hydrocarbon or halogenated hydrocarbon radical such as those shown for Z above and M' in any divalent hydrocarbon radical both valences of which are attached to the carbon, such as hexylene, pentylene or octylene; ureido groups of the formula —N(M)CONM''₂ in which M is defined above and M'' is H or any of the M radicals; carbamate groups of the formula —OOCNMM'' in which M and M'' are defined above, or carboxylic amide radicals of the formula —NMC=O(M'') in which M and M'' are defined above.

The term "hydrolyzable group" means any group attached to the silicon which is hydrolyzed by water at room temperature. The non-acidic character of the hydrolyzable groups imparts stability and maintains the alkalinity of the silane-modified zwitterion composition. The preferred hydrolyzable radicals are alkoxy groups containing from one to four inclusive carbon atoms. Hydrolyzates of the silanes, in the form of water soluble partial condensates, may also be utilized in the practice of the invention. The partial condensates contain ≡ SiOSi ≡ units but a detectable amount of hydroxyl or hydrolyzable groups (preferably at least one such group per every four silicon atoms) remain uncondensed and are available for reaction with sites on inorganic surfaces to provide chemical bonding.

The sulfonium zwitterionic monomers are very soluble in water and other polar solvents such as methanol and isopropanol. The described organosilanes are also soluble, although to a lesser extent, in water and polar solvents. Thus, the silane-modified zwitterionic composition is readily prepared by mixing aqueous solutions of the two components. The mixed aqueous solution can then be added to the latex in the desired quantity.

The synthetic latexes in which the silane-modified zwitterionic compositions are effective are flexible vinylic polymers dispersed in an aqueous media. "Flexible" as used herein designates polymers having a glass transition temperature (Tg) of below room temperature (25° C). The vinylic polymers are prepared by free-radical polymerization of monomers containing unsaturated carbon multiple bonds such as the vinyl group. The term "polymer" is used in its generic sense and includes both homopolymers and copolymers obtained by vinylic polymerization.

Illustrative of unsaturated polymerizable monomers are styrene, alpha-methyl styrene, vinyl toluene, chlorostyrenes, acrylonitrile, methyacrylonitrile, butadiene, isoprene, chloroprene, vinylpyridine, vinyl acetate, vinyl chloride, vinylidene chloride, ethylene, vinylidene fluoride, methyl methacrylate, methyl acrylate, methacrylic acid, ethyl acrylate, acrylic acid and the like. When copolymeric latexes are utilized the following combination of monomers may be suitable: styrene-acrylonitrile, styrene-butadiene, styrene-methyl methacrylate, acrylonitrile-butadiene-styrene, vinyl acetate-vinyl chloride, methyl methacrylate-ethyl acrylate, ethylene-vinyl acetate, ethylene-vinylidene chloride and the like. Presently preferred polymers are the acrylates and styrene-butadiene copolymers.

The latex is an emulsion of thermoplastic vinylic polymer particles in an aqueous media and can contain the various additives, stabilizers, surfactants, pigments, and fillers conventionally used in latexes. The solids content or amount of polymer present in the latex will vary with the application. For example, a vinylpyridine copolymer is applied to tire cords from a latex containing only 3–5% solids, while latex paint formulations contain 10 to 50 % polymer solid and dip coatings and caulks can contain up to 70% polymer solids.

The silane-modified zwitterion composition is added to the latex in an amount in the range of from 0.5 to 10 weight percent, based on the weight of polymer solids present in the latex. The optimum amount of silane and silane plus zwitterion monomer will depend upon the particular polymer in the latex and the conditions under which the latex film or coating is cured. While there is a noticeable increase in adhesion when the silane-modified zwitterion composition is added at the 0.5 weight percent level it is preferred to utilize at least 1 percent of the additive in the latex. The silane-modified zwitterion composition is soluble in water and is easily mixed with the aqueous dispersion of vinylic polymer to prepare the latexes of the invention.

Films and coatings deposited from the latexes of the present invention exhibit greatly increased adhesion to a variety of substrates, such as glass, ceramics, steel, aluminum and titanium, and to other polymer substrates, such as polyester, epoxy, phenolic and nylon surfaces. Since the silane-modified zwitterion additive is effective at relatively low concentrations, it is possible to obtain the improved adhesion without significantly affecting flexibility, gloss, thermoplasticity and other properties of the coating.

The following examples are illustrative and not to be construed as limiting the invention as delineated in the claims.

EXAMPLE 1

An aqueous solution of (CH₃O)₃SiCH₂CH₂CH₂NHCH₂CH₂NH₂ was mixed with a methanol solution of zwitterion monomer of the formula

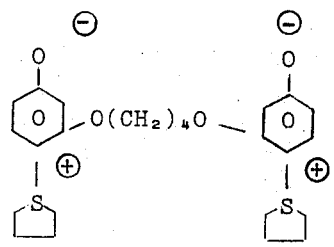

Sufficient silane was added to provide 5 weight percent silane, based on the weight of zwitterion monomer in the composition. The additive at 30% solids was mixed with a commercially available unpigmented acrylate latex (Rohm and Haas-AC-35 containing emulsified acrylic polymer at 50% solids) to provide a latex containing 6% of the silane-modified zwitterion on a solids weight basis.

The additive-containing latex was filmed onto glass slides and dried for 1 hour at 100° C. The films were clear, flexible and had excellent dry adhesion to glass. Adhesion was determined after soaking the glass slide in water for 24 hours and again found to be excellent.

Various other silanes were added to the described zwitterion monomer at the 5% level. These silane-modified zwitterion compositions were added to portions of described acrylic latex, filmed onto glass slides, dried for 1 hour at 100° C., soaked in water for 24 hours and the degree of adhesion determined. A rating of "poor" was given to films which floated off the glass or were removed with very little difficulty, a rating of "fair" indicating that a continuous film was lifted from the glass with only a small amount of pull and a rating of "excellent" indicating cohesive failure of the film during removal from the glass surface.

The unmodified latex, zwitterion-modified latex (containing no silane) and latex containing only the silane (at comparable levels) were also tested in the above-described manner. Results are tabulated below.

These data demonstrate that the selected group of silanes in combination with the zwitterion monomer act as insitu primers while neither the silane alone nor the zwitterion monomer show the effect. In addition, other silanes known to be coupling agents, such as vinyltrimethoxysilane, have no effect even when combined with the zwitterion monomers.

EXAMPLE 2

Various amounts of beta-aminoethyl-gamma-aminopropyltrimethoxysilane were added to alcholic solutions of the zwitterion monomer described in Example 1. These solutions were mixed with portions of the acrylic latex described in Example 1 in amounts sufficient to provide 6% additive based on the weight of solids. Samples of each latex film were prepared by coating at least two glass slides and allowing one to air dry at room temperature for 5 days, and the other being dried for 1 hour at 100° C. After drying, the coated slides were soaked in water for 24 hours and film adhesion determined. The adhesion developed by the use of the aminosilane at various concentrations is given below.

Adhesion of Acrylic Latex Containaing Silane-Modified Zwitterion

| Wt.% Silane Present in Zwitterion | Film Cured at Room Temp. 5 days | Film Cured at 100°C |
|---|---|---|
| none | poor | poor |
| 0.2 | poor | poor |
| 0.5 | poor | fair |
| 1.0 | fair | good |
| 2.0 | fair | Excellent |
| 4.0 | fair-good | Excellent |

ADHESION OF ACRYLATE FILMS containing

| Silane Added to Zwitterion or Used Alone | Silane-Modified Zwitterion | Silane Alone |
|---|---|---|
| none | poor | poor |
| $CH_3Si(OCH_3)_3$ | poor | Poor - Fair |
| $CH_2=CHSi(OCH_3)_3$ | poor | poor |
| $H_2N(CH_2)_3Si(OC_2H_5)_3$ | Fair | poor |
| $H_2N(CH_2)_2NH(CH_2)_3Si(OCH_3)_3$ | Excellent | poor |
| $(CH_3)_2NCH_2CH_2CH_2Si(OCH_3)_3$ | Excellent | poor |
| $(CH_3)HNCH_2CH_2CH_2Si(OCH_3)_3$ | Excellent | poor |
| $CH_2\overset{O}{-}CHCH_2O(CH_2)_3Si(OCH_3)_3$ | Excellent | poor |
| $HS(CH_2)_3Si(OCH_3)_3$ | Excellent | poor |
| $HOOC-CH=CH-\overset{O}{\underset{\|}{C}}-\overset{CH_3}{\underset{\|}{N}}-CH_2CH_2CH_2Si(OCH_3)_3$ | Good | poor |

These data demonstrate that very small amounts (0.5%) of the silane in the zwitterion monomer give a significant effect when the latex film is heat-cured.

EXAMPLE 3

Sufficient beta-aminoethyl-gamma-aminopropyl trimethoxysilane was added to an alcholic solution of zwitterionic monomer of the formula

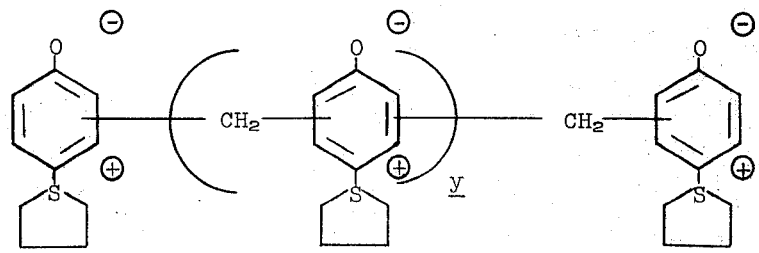

$x$ has an average value of about 0.5) to provide 2 weight % silane in the modified zwitterion composition. This material was added to various types of flexible vinylic polymer latexes (all of the polymers having a T(g) of less than 25° C) to provide latexes containing 5 weight percent on a solids basis of the silane-modified additive. The latexes were coated onto glass slides, dried for 30 minutes at 100° C and soaked in water for 24 hours, after which film adhesion was determined.

The adhesion for the different latex polymers is given in the table below:

Adhesion of Modified Latex Films

| | Latex Polymer Composition * | Wet Adhesion to Glass |
|---|---|---|
| 1. | carboxy-functional styrene-butadiene copolymer containing 60% styrene | excellent |
| 2. | 60% styrene-40% butadiene copolymer | excellent |
| 3. | 24% styrene-76% butadiene copolymer | good |
| 4. | vinylpyridinene-styrene-butadiene copolymer | good |
| 5. | butadiene-acrylonitrile copolymer | good |
| 6. | ethylene-vinylacetate copolymer | fair |
| 7. | vinylacetate copolymer | good |
| 8. | acrylate copolymer | good |
| 9. | vinylchloride-acrylate copolymer | good |
| 10. | carboxy-functional vinylchloride-acrylic copolymer | fair |

*All are commercially available latex compositions containing conventional emulsifiers.

The latexes in the above table exemplify the types of flexible vinylic polymers which can be used in the practice of the invention.

EXAMPLE 4

To demonstrate the operable zwitterion copolymers useful in the practice of the invention alcholic solutions containing various proportions of monofunction zwitterion monomer to difunctional monomer were prepared. Sufficient beta-aminoethyl-gamma-aminopropyltriethoxysilane was added to each of the solutions of monomer mixtures to provide 5% silane (based on solids) in the additive composition. The solutions were mixed with flexible acrylic latexes in amounts sufficient to provide 5% (based on solids) of the additive in the latex.

The modified acrylic latexes were coated onto glass slides; the film dried for 30 minutes at 110° C; soaked in water for 24 hours and adhesion was determined. The type and amount of zwitterion monomer used and the adhesion values for each are tabulated below:

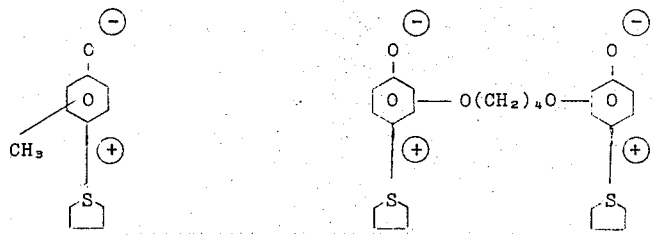

| Silane-Modified Zwitterion | | Additive Containing Acrylic Latex - Film Adhesion |
|---|---|---|
| wt.% Monofunctional | wt.% Difunctional | |
| 100 | 0 | poor |
| 99.6 | 0.4 | poor |
| 99.0 | 1 | poor |
| 97 | 3 | poor to fair |
| 93 | 7 | fair |
| 90 | 10 | excellent |
| 80 | 20 | excellent |
| 70 | 30 | excellent |
| 60 | 40 | excellent |
| 40 | 60 | excellent |
| 20 | 80 | excellent |
| 0 | 100 | excellent |

These data demonstrate that to obtain good adhesion, the difunctional zwitterionic monomer should be present in about at least 10 weight % when mixtures of the monofunctional and difunctional monomers are utilized. For reasons of economy, it is preferred to use mixtures containing for about 10 to 20 weight percent of the difunctional monomer as the zwitterion component utilized in the practice of the invention.

EXAMPLE 5

The flexible acrylic latex of Example 1 containing 5 weight % of a mixture of 2% beta-amino-gamma-aminopropyl ethyltrimethoxysilane and 98% of the difunctional zwitterionic monomer of Example 1 was coated onto various substrates. The films were dried for 30 minutes at 100° C and both dry and wet adhesion (after soaking for 24 hours) were determined. For purposes of comparison, the unmodified latex was coated unto the same type of substrates and cured and tested in the same manner.

Adhesion was rated according to the following scale: "0" indicating poor dry adhesion; "1" indicating good dry adhesion but poor wet adhesion; "2" indicating good dry adhesion and fair wet adhesion and "3" indicating good dry adhesion and good wet adhesion. Results for the various substrates are tabulated below:

ADHESION OF ACRYLIC LATEX FILMS

| Surface | Latex Alone | Latex Containing 5% silane-modified Zwitterion monomer |
| --- | --- | --- |
| Glass | 0 | 3 |
| Ceramic Tile | 0 | 3 |
| Tin-Coated Steel | 1 | 3 |
| Cold-Rolled Steel | 0 | 3 |
| Stainless Steel | 0 | 3 |
| Chromium-Plated Steel | 0 | 3 |
| Aluminum | 0 | 3 |
| Titanium | 0 | 3 |
| Galvinized Steel | 1 | 3 |
| Magnesium | 1 | 3 |
| Polyester Laminate | 1 | 3 |
| Epoxy Laminate | 1 | 3 |
| Phenolic Laminate | 1 | 3 |
| Mylar Film | 0 | 3 |
| Nylon Film | 1 | 2 |

These data show the excellent adhesion obtained by the practice of the invention.

EXAMPLE 6

When an iminofunctional silane, such as

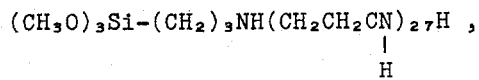

is substituted for the amino-functional silane at the 2% level in the zwitterion composition of Example 2 and the composition is added to the same type of acrylic latex, eqivalent adhesion is obtained.

Reasonable modification and variation are within the scope of the invention which is directed to improved flexible polymeric latexes.

That which is claimed is:

1. A polymeric latex comprising
   A. a flexible vinylic polymer dispersed in an aqueous media; and
   B. 0.5 to 10 weight percent, based on the weight of vinylic polymer, of a silane-modified zwitterionic composition, said composition consisting essentially of a. about 90 to 99.5 weight percent of soluble zwitterionic monomer, at least about 10 weight percent of said monomer being polyfunctional and of the formula

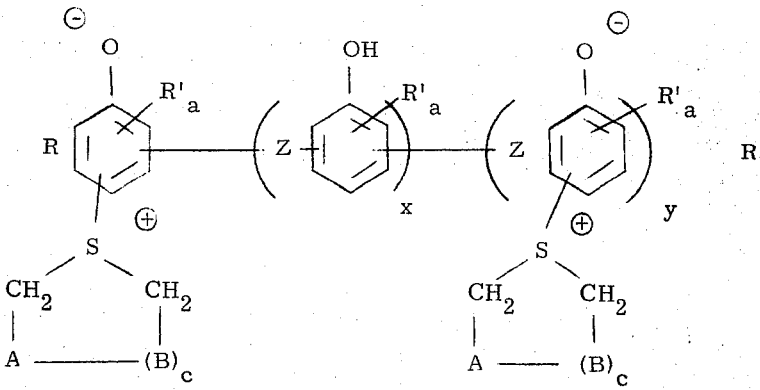

in which
   each R is independently selected from the group consisting of hydrogen, chlorine and bromine atoms, the hydroxyl group and alkoxy radicals containing from one to four inclusive carbon atoms; each R' is independently selected from the group consisting of hydrogen, chlorine and bromine atoms and alkyl radicals containing from one to four inclusive carbon atoms; at least one R' being a hydrogen atom and $a$ having a value of 2 or 3;
   each sulfur is ortho or para to the phenolic oxygen each A and B are independently selected from the group consisting of —$CH_2$—, —CHR'—, and $c$ has a value of 1 or 2; Z is a bridging radical selected from the group consisting of —CR''$_2$—, —O—, —S—, —O($C_mH_{2m}$)O—, or $$-OC(C_nH_{2n})CO-;$$
$$\phantom{-O}\underset{O}{\|}\phantom{(C_nH_{2n})}\underset{O}{\|}$$

in which each R'' is a hydrogen atom or an alkyl radical containing from one to four inclusive carbon atoms; $m$ has a value of from 1 to 6 inclusive and $n$ has a value of from 2 to 6 inclusive;

$x$ and $y$ are numbers with a sum of from 1 to 20;
any remaining monomer being monofunctional and of the formula

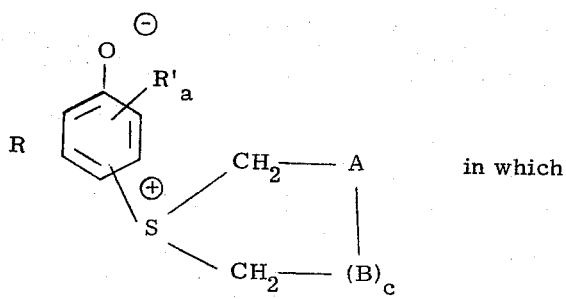

R, R', A, B and c are as defined; and b. 0.5 to 10 weight percent of an organosilane coupling agent or water soluble partial condensate thereof, said silane having an organofunctional substituent attached to the silicon atom through a silicon-carbon bond, said substituent being selected from the group consisting of epoxy, amine, imino, carboxy and mercapto radicals; the remaining substituents being hydroxyl groups or nonacidic hydrolyzable radicals.

2. A latex in accordance with claim 1 wherein the organosilane is of the general formula $R'''Si(OH)_3$ and partial condensates thereof in which $R'''$ is selected from the group consisting of epoxy, amino and mercaptopropyl radicals.

3. A latex in accordance with claim 2 wherein the silane (b) is of the formula $(CH_3O)_3SiCH_2CH_2CH_2NHCH_2CH_2NH_2$.

4. A latex in accordance with claim 2 wherein the silane (b) is of the formula $(C_2H_5O)_3SiCH_2CH_2CH_2NH_2$.

5. A latex in accordance with claim 2 wherein the silane (b) is of the formula $(CH_3O)_3SiCH_2CH_2CH_2NH(CH_3)$.

6. A latex in accordance with claim 2 wherein the silane (b) is of the formula $(CH_3O)_3SiCH_2CH_2CH_2N(CH_3)_2$.

7. A latex in accordance with claim 2 wherein the silane (b) is of the formula

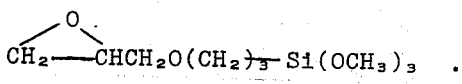

8. A latex in accordance with claim 2 wherein the silane (b) is of the formula $HSCH_2CH_2CH_2Si(OCH_3)_3$.

9. A latex in accordance with claim 1 wherein the polyfunctional zwitterionic monomer is present in an amount in the range of 10 to 20 weight percent of the total zwitterionic monomer.

10. A latex in accordance with claim 1 wherein the silane-modified zwitterionic composition (B) is present in the polymeric latex in an amount of at least 1 weight percent as based on the weight of vinylic polymer present in said latex.

11. A latex in accordance with claim 1 wherein the polyfunctional zwitterionic monomer is of the formula

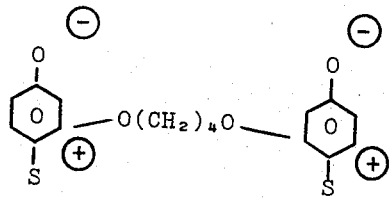

12. A polymeric latex in accordance with claim 11 wherein the monofunctional zwitterionic monomer is present as no more than 90 weight percent of a monomer mixture and is of the formula

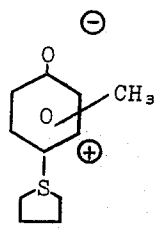

13. A latex in accordance with claim 1 wherein the polyfunctional monomer is of the formula

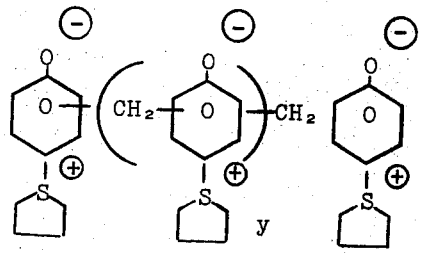

in which y has an average value of about 0.5.

14. A latex in accordance with claim 1 wherein the vinylic polymer (A) is an acrylic polymer.

15. A latex in accordance with claim 1 wherein the vinylic polymer (A) is a styrene copolymer.

16. A latex in accordance with claim 15 wherein the vinylic polymer (A) is a styrene-butadiene copolymer.

17. A latex in accordance with claim 1 wherein the vinylic polymer (A) is an acrylic polymer containing at least 1 weight percent of a silane-modified zwitterionic composition wherein the polyfunctional monomer is of the formula

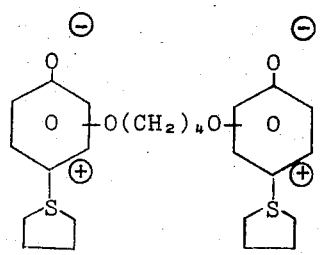

and the silane is of the formula $(CH_3O)_3Si-(CH_2)_3-NHCH_2CH_2NH_2$.

* * * * *

UNITED STATES PATENT AND TRADEMARK OFFICE
CERTIFICATE OF CORRECTION

PATENT NO. : 3,862,079
DATED : January 21, 1975
INVENTOR(S) : EDWIN P. PLUEDDEMANN It is certified that error appears in the above-identified patent and that said Letters Patent are hereby corrected as shown below:

Column 1, line 1, the title should read --LATICES COMPRISING SILANE-MODIFIED ZWITTERION RESINS-- instead of "MODIFIED ZWITTERION RESINS".

Column 15, line 30, the last portion of the formula should read --$CH_2CH_2NH_2$--, instead of "$CH_2Ch_2NH_2$".

Signed and Sealed this sixth Day of January 1976

[SEAL]

Attest:

RUTH C. MASON
Attesting Officer

C. MARSHALL DANN
Commissioner of Patents and Trademarks